US010043627B2

(12) United States Patent
Dorella et al.

(10) Patent No.: US 10,043,627 B2
(45) Date of Patent: Aug. 7, 2018

(54) DEVICE FOR MONITORING A CURRENT OF A PRIMARY CONDUCTOR WITH RESPECT TO A PREDETERMINED CURRENT THRESHOLD, AND RELATED TRIP ASSEMBLY AND SWITCHING DEVICE

(71) Applicant: ABB S.P.A., Milan (IT)

(72) Inventors: Emanuele Dorella, Brembate (IT); Tatiana Escallada Casas, Sorisole (IT); Sergio Toscani, Casalpusterlengo (IT)

(73) Assignee: ABB S.P.A., Milan (IT)

( * ) Notice: Subject to any disclaimer, the term of this patent is extended or adjusted under 35 U.S.C. 154(b) by 180 days.

(21) Appl. No.: 15/116,879

(22) PCT Filed: Feb. 6, 2014

(86) PCT No.: PCT/EP2014/052368
§ 371 (c)(1),
(2) Date: Aug. 5, 2016

(87) PCT Pub. No.: WO2015/117661
PCT Pub. Date: Aug. 13, 2015

(65) Prior Publication Data
US 2017/0169980 A1 Jun. 15, 2017

(51) Int. Cl.
*H02H 7/00* (2006.01)
*H01H 71/24* (2006.01)
(Continued)

(52) U.S. Cl.
CPC ......... *H01H 71/2454* (2013.01); *H01F 30/06* (2013.01); *H01H 9/54* (2013.01)

(58) Field of Classification Search
CPC ........................................ H01H 71/2454
See application file for complete search history.

(56) References Cited

U.S. PATENT DOCUMENTS 4,437,079 A * 3/1984 Hastings ............ H01H 71/2436 335/170
5,504,427 A * 4/1996 Cooper .................... G01B 7/30 324/207.13

(Continued)

*Primary Examiner* — Stephen W Jackson
(74) *Attorney, Agent, or Firm* — Polsinelli PC

(57) ABSTRACT

A device for monitoring a current in a primary conductor with respect to a predetermined current threshold, comprising:

- a magnetic circuit associable to the primary conductor and comprising a fixed part and an element which can rotate about a rotation axis;
- at least one spring operatively connected to the rotating element for keeping it in a first position, the spring being elastically deformable along a linear axis; and
- sensing means operatively associated to the magnetic circuit.

The magnetic circuit is configured in such a way that the rotating element rotates from the first position to a second position when the current in the primary conductor exceeds the predetermined current threshold, so as to at least reduce one or more air gaps between the rotating element and the fixed part and to elongate the spring from a first length to a second length. The sensing means are configured for generating an output electrical signal caused by the rotation of the rotating element from the first position to the second position.

The at least one spring is operatively connected to the rotating element in such a way to tilt towards the rotation axis moving above a surface of the rotating element which is transversal to the rotation axis, during the rotation of the rotating element from the first position to the second position.

20 Claims, 10 Drawing Sheets

(51) Int. Cl.
*H01F 30/06* (2006.01)
*H01H 9/54* (2006.01)

(56) References Cited

U.S. PATENT DOCUMENTS

| | | | | |
|---|---|---|---|---|
| 6,034,858 | A | 3/2000 | Serpinet et al. | |
| 7,639,107 | B2 * | 12/2009 | Ohkubo | H01H 71/123 335/78 |
| 9,852,867 | B2 * | 12/2017 | Tsuboi | H01H 71/2454 |
| 2007/0086131 | A1 | 4/2007 | Miller et al. | |

* cited by examiner

DEVICE FOR MONITORING A CURRENT OF A PRIMARY CONDUCTOR WITH RESPECT TO A PREDETERMINED CURRENT THRESHOLD, AND RELATED TRIP ASSEMBLY AND SWITCHING DEVICE

CROSS REFERENCE TO RELATED APPLICATIONS

This application is a National Phase filing under 35 U.S.C. § 371 of PCT/EP2014/052368 filed on Feb. 6, 2014 under 35 U.S.C. § 119. The entire contents of this application are hereby incorporated by reference.

The present invention relates to a device for monitoring a current of a primary conductor with respect to a predetermined current threshold, especially for applications with direct currents or alternating currents with low frequency.

Further, the present invention relates to a trip assembly and a switching device using such current monitoring device.

Generally, current transformers of known type are used for monitoring an alternating current flowing in a primary conductor; these transformers have a fixed ferromagnetic core which surrounds a primary conductor, and a secondary winding wound around a portion of the core. The magnetic flux generated in the core causes an electrical signal in the secondary winding, when the current is flowing in the primary conductor.

A transformer of this known type can be used in electrical switching devices, typically circuit breakers, disconnectors and contactors.

For example, a circuit breaker is conceived to protect the electrical circuit into which is installed from overcurrent fault conditions, such as a current condition due to an overload or a short-circuit.

In order to carry out this protective function, the circuit breaker comprises one or more contacts which are separable from corresponding fixed contacts for interrupting the flowing current, and a trip unit, such as an electronic relay, for causing the separation of the contacts when a fault overcurrent condition is detected.

A current transformer of the above disclosed known type can be associated to the trip unit for sensing an overcurrent fault condition. Further, the electrical signal generated at the ends of the secondary winding can also be used to supply the trip unit.

The above disclosed known current transformers are not adapted for monitoring a direct current or for adequately monitoring alternating currents with very low frequencies, for example less than 10 Hz. Further, in these cases the secondary winding would not generate an electrical signal suitable for supplying a trip unit.

U.S. Pat. No. 6,034,858 discloses a current monitoring device which is adapted to sense when a current flowing in a primary conductor exceeds a predetermined current threshold, even in case of a direct current or an alternating current with low frequency.

This known current monitoring device comprises:

- a magnetic circuit associable to the primary conductor, having a fixed part and an element movable with respect to the fixed part; and
- a secondary winding wound around a corresponding portion of the magnetic circuit.

In one embodiment of this monitoring device the movable element is a blade which can pivot about a spindle. The blade is hold in a rest position by a spring, and at least one air gap is present between the fixed part and the blade hold in the rest position.

The magnetic circuit is configured in such a way that the blade rotates away from the rest position so as to reduce the air gap with the fixed part, when the current in the primary conductor exceeds the predetermined current threshold.

The rotation of the blade causes the generation of an electrical signal in the secondary winding.

The holding spring under elongation exerts a resistive torque against the rotation of the blade for reducing the air gap.

Due to the increase of the elastic force exerted by the spring under elongation, there is an increasing tendency of the resistive torque which can slow or even stop the desired rotation of the blade.

Further, since the mechanical work for rotating the blade depends on the torque value at the end of the blade rotation, the increasing of the resistive torque reduces the efficiency of the energy transfer occurring in the magnetic circuit for generating the output electrical signal in the secondary winding.

In light of above, there is still reason and desire for further improvements in the solutions belonging to the state of the art.

Such desire is fulfilled by a device for monitoring a current in a primary conductor with respect to a predetermined current threshold, the device comprising:

- a magnetic circuit associable to the primary conductor and comprising a fixed part and an element which can rotate about a rotation axis;
- at least one spring operatively connected to the rotating element for keeping the rotating element in a first position, the spring being elastically deformable along a linear axis; and
- sensing means operatively associated to the magnetic circuit.

The magnetic circuit is configured in such a way that the rotating element rotates from the first position to a second position when the current in the primary conductor exceeds the predetermined current threshold, so as to at least reduce one or more air gaps between the rotating element and the fixed part and to elongate the spring along the linear axis from a first length to a second length. The sensing means are configured for generating an output electrical signal caused by the rotation of the rotating element from the first position to the second position.

The at least one spring is operatively connected to the rotating element in such a way that the spring tilts towards the rotation axis moving above a surface of the rotating element which is transversal to the rotation axis, during the rotation of the rotating element from the first position to the second position.

Another aspect of the present disclosure is to provide a trip assembly for an electrical switching device, comprising at least one trip unit for actuating the switching device and a device as the monitoring device defined by the annexed claims and disclosed in the following description; such device being operatively associated to the at least one trip unit.

Another aspect of the present disclosure is to provide a switching device comprising at least one device and/or at least one trip assembly as the monitoring device and the trip assembly defined by the annexed claims and disclosed in the following description.

Further characteristics and advantages will become more apparent from the description of some preferred but not exclusive embodiments of the current monitoring device according to the disclosure, illustrated only by way of non-limiting examples with the aid of the accompanying drawings, wherein.

Figure 1:
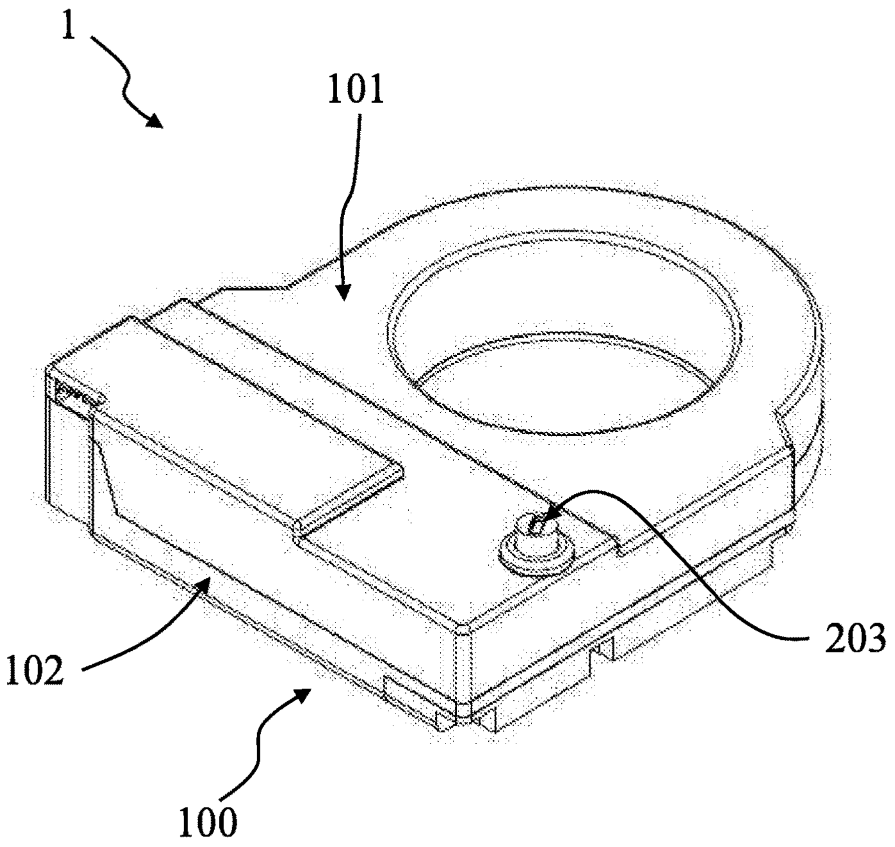
FIG. 1 is a perspective view of a current monitoring device according to the present disclosure.
Figure 2:
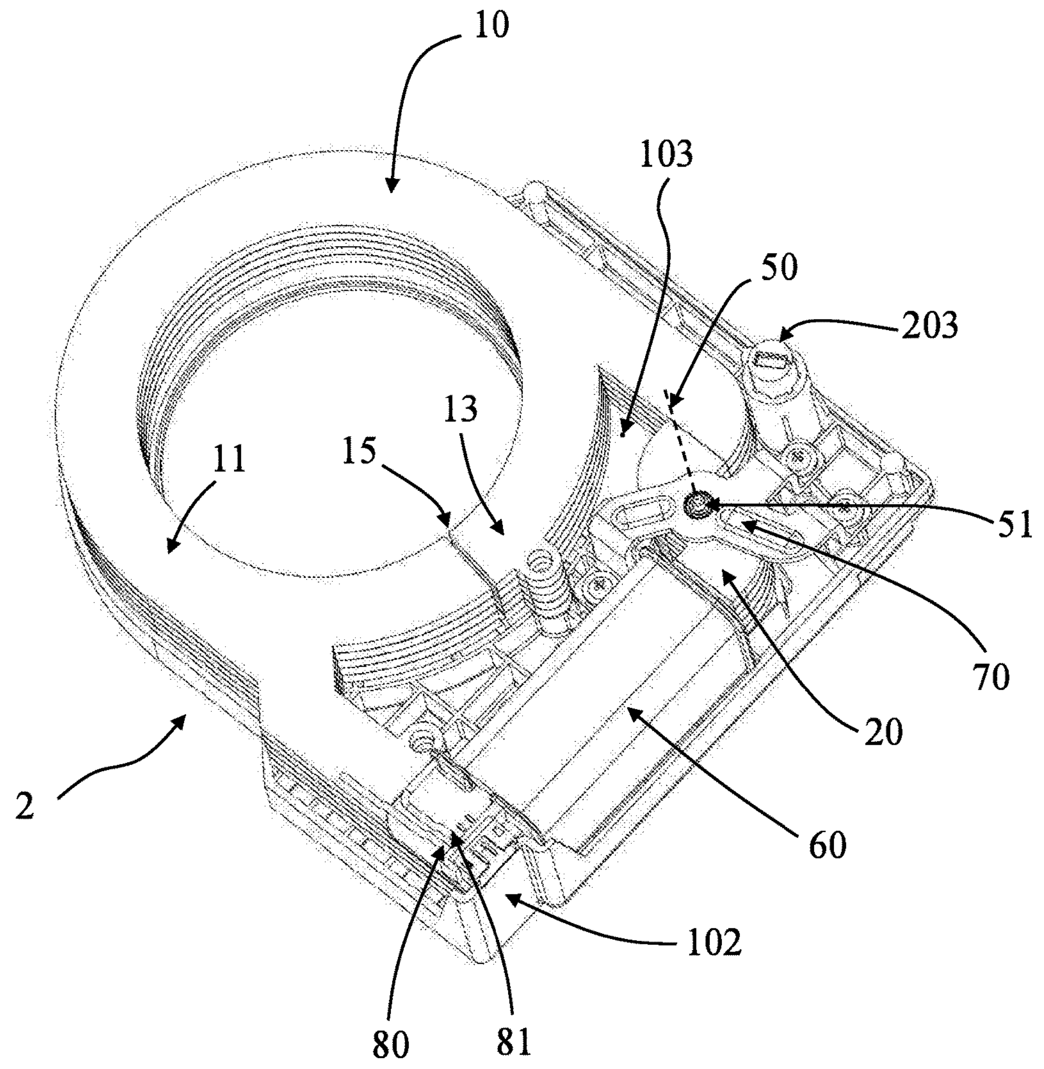
FIG. 2 illustrates the current monitoring device of FIG. 1, wherein a portion of its casing has been removed to show some internal components.
Figure 3:
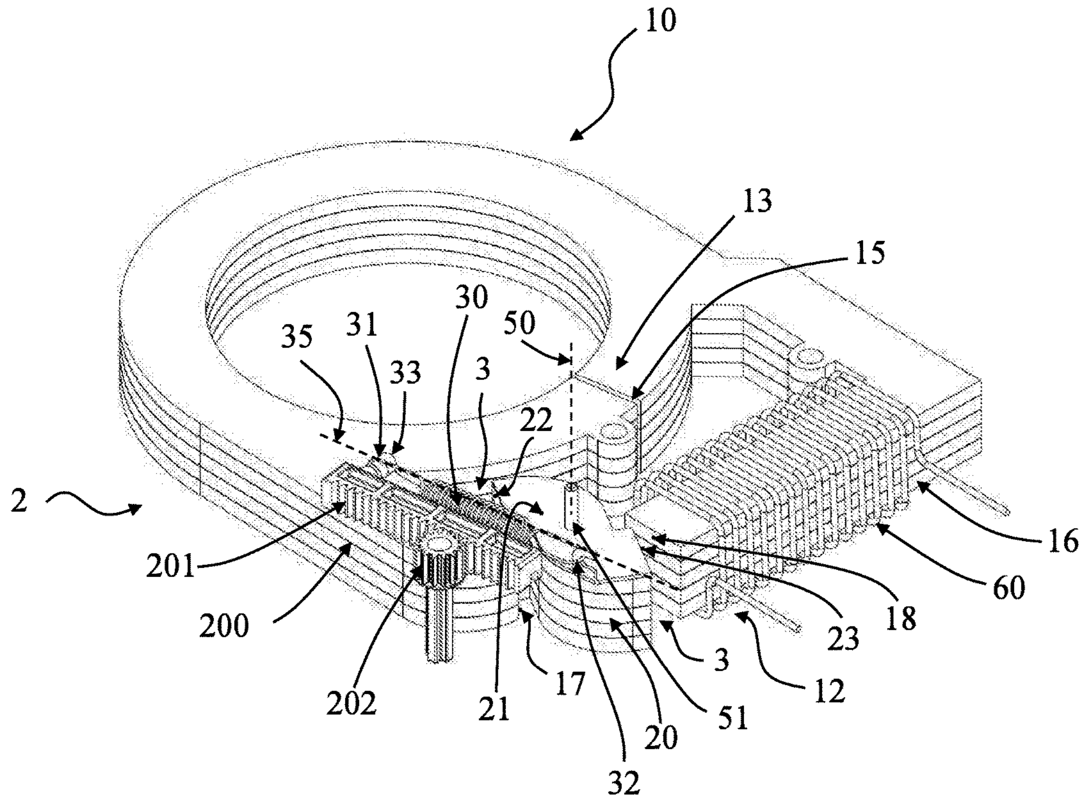
FIG. 3 illustrates some internal components of the current monitoring device of FIG. 1, from a different point of view with respect to FIG. 2.

It should be noted that in the detailed description that follows, identical or similar components, either from a structural and/or functional point of view, have the same reference numerals, regardless of whether they are shown in different embodiments of the present disclosure; it should also be noted that in order to clearly and concisely describe the present disclosure, the drawings may not necessarily be to scale and certain features of the disclosure may be shown in somewhat schematic form.

Further, when the term "adapted" or "arranged" or "configured" or "shaped", is used herein while referring to any component as a whole, or to any part of a component, or to a whole combinations of components, or even to any part of a combination of components, it has to be understood that it means and encompasses correspondingly either the structure, and/or configuration and/or form and/or positioning of the related component or part thereof, or combinations of components or part thereof, such term refers to.

Finally, the term transversal or transversally hereinafter used encompasses a direction non-parallel to the element or direction it is related to, and perpendicularity has to be considered a specific case of transverse direction.

The present disclosure is related to a device for monitoring a current in a primary conduct 5 with respect to a predetermined current threshold, which is overall indicated with numeral reference 1 in the attached figures and which is hereinafter indicating for sake of simplicity as "monitoring device 1".

The monitoring device 1 comprises a magnetic circuit (overall indicated with numeral reference 2 in the attached figures) which is associable to the primary conductor 5 to be monitored.

According to the exemplary embodiment illustrated in FIG. 1, the monitoring device 1 comprises a casing 100 made of insulating material for housing the magnetic circuit 2; preferably, the casing 100 is realized by operatively coupling a first insulating shell 101 and a second insulting shell 102 to each other.

The magnetic circuit 2 comprises a fixed part 10 and an element 20 which can rotate with respect to the fixed part 10 about a rotation axis 50. The fixed part 10 and the rotating element 20 are made of ferromagnetic material; preferably, they are made of stacked ferromagnetic sheets.

With reference to the attached figures, the monitoring device 1 according to the present invention further comprises at least one spring 30 elastically deformable along a linear axis 35.

This spring 30 is operatively connected to the rotating element 20 for keeping it in a first position where at least one air gap 3 is present between the fixed part 10 and the rotating element 20.

In other words, the spring 30 is operatively connected to the rotating element 20 in such a way to exert an elastic force for causing a return of the rotating element 20 in the first position, when it is elastically deformed by a rotation of the element 20 away from the first position.

Figure 8:
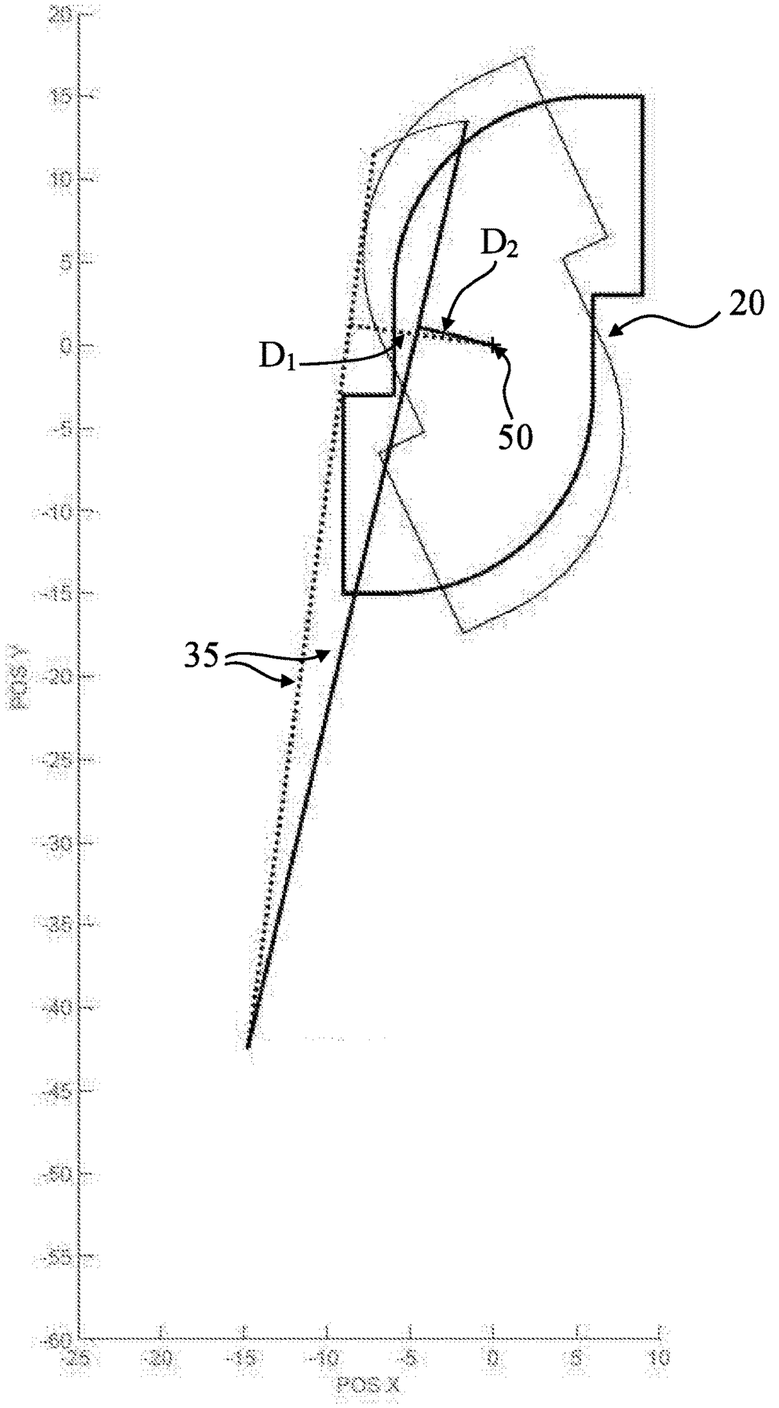
FIG. 8 is a schematic view related to the rotating element and associated spring illustrated in FIGS. 4 and 5.
Figure 9:
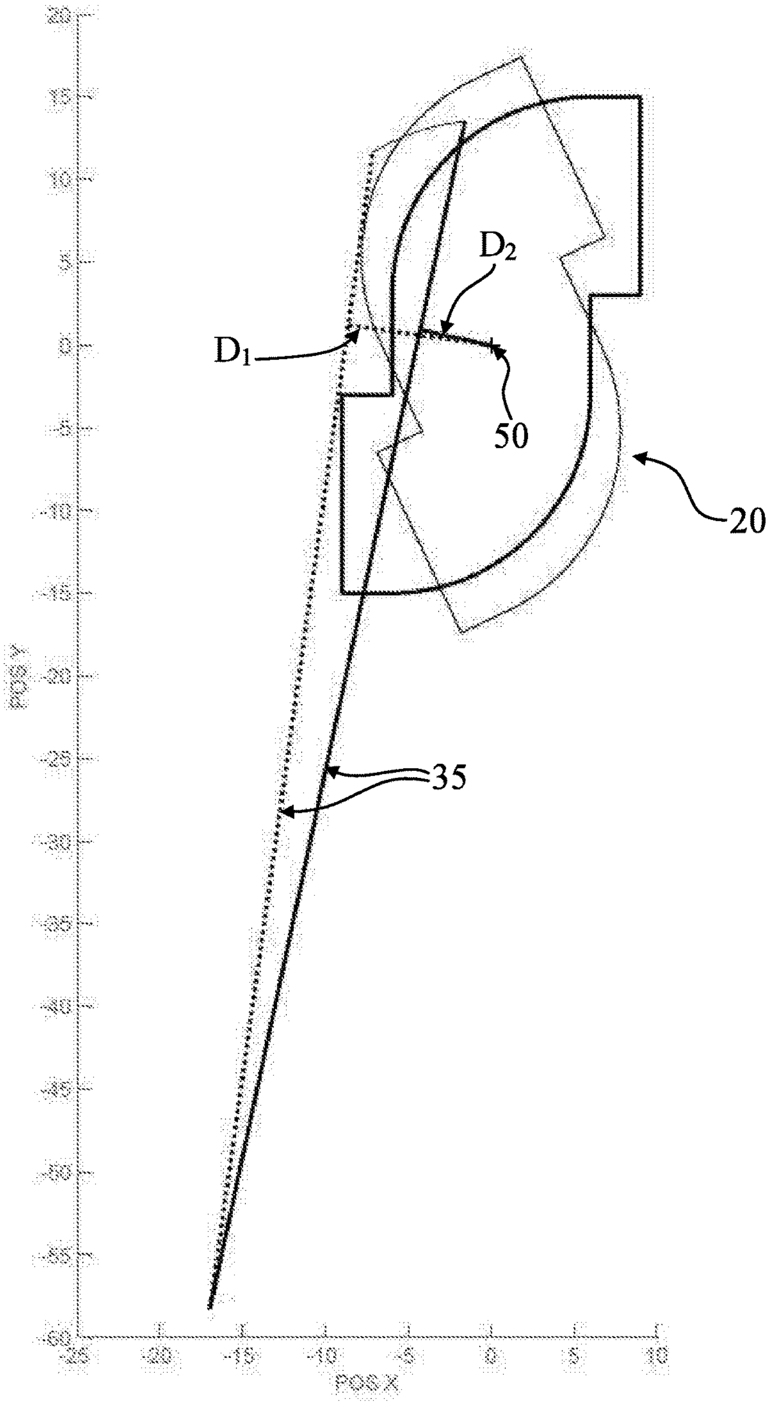
FIG. 9 is a schematic view related to the rotating element and associated spring illustrated in FIGS. 6 and 7.

The linear axis 35 of the spring 30 and the rotation axis 50 of the rotating element 20 in the first position are separated by a first minimum distance $D_1$ (depicted for example in FIGS. 8 and 9).

The magnetic circuit 2 is configured in such a way that the rotating element 20 rotates from the first position to a second position, when the current in the primary conductor 5 exceeds a predetermined current threshold.

This rotation causes at least a reduction of the one or more air gaps 3 between the rotating element 20 and the fixed part 10, and an elongation of the spring 30 along its linear axis 35 from a first, or initial, length $X_I$ to a second, or final, length $X_F$. Preferably, the one or more air gaps 3 are eliminated by a contact between the fixed part 10 and the rotating element 20 in the second position.

In practice, the magnetic circuit 2 is configured in such a way to generate an electromotive force acting on the rotating element 20 for causing its rotation from the first position hold by the spring 30 towards the second position, when a current is flowing in the primary conductor 5. Hence, the generated electromotive force acts on the rotating element 20 for reducing the one or more air gaps 3 and changing the magnetic circuit 2 from a configuration with maximum reluctance to a configuration with minimum reluctance.

The predetermined current threshold above which the element 20 rotates from the first position to the second position is set by the spring 30; indeed, the spring 30 is devised in such a way that the electromotive force acting on the rotating element 20 is strong enough to elongate the spring 30 and rotate the element 20 towards the second position only when the flowing current in the primary conductor 5 exceeds a desired current value.

The monitoring device 1 further comprises sensing means 60, 70 operatively associated to the magnetic circuit 2. These sensing means 60, 70 are configured for generating an output electrical signal 61, 62 which is caused by the rotation of the rotating element 20 from the first position to the second position. In this way, the condition where the current flowing in the primary conductor 5 exceeds the predetermined current threshold set by the spring 30 is detected by means of the generated output electrical signal 61, 62.

Advantageously, the at least one spring 30 of the monitoring device 1 according to the present disclosure is operatively connected to the rotating element 20 in such a way to tilt towards the rotation axis 50 and move above a surface 21 of the rotating element 20 which is transversal to the rotation axis 50, during the rotation of the rotating element 20 from the first position to the second position.

At the end of the rotation of the element 20 from the first position to the second position, the linear axis 35 of the spring 30 and the rotation axis 50 are separated by a second minimum distance $D_2$ (depicted for example in FIGS. 8 and 9): In particular, due to the tilting of the spring 30 towards the rotation axis 50, this second minimum distance $D_2$ is less than the first minimum distance $D_1$ present before the rotation.

Further, the spring 30 can reach a position very close to the rotation axis 50 at the end of the rotation of the element 20, since the spring 30 can shift above the surface 21 of the element 20 under rotation, during at least a tract of its tilting towards the rotation axis 50. In this way, a relevant reduction of the minimum distance between the linear axis 35 of the spring 30 and the rotation axis 50 can occur during the rotation of the element 20 from the first position to the second position.

The magnitude of the resistive torque exerted by the spring 30 against the desired rotation of the element 20 from the first position to the second position is equal to the product between the elastic force of the spring 30, which is directed along the linear axis 35, and the moment arm, which corresponds to the minimum distance between the linear axis 35 and the rotation axis 50.

Hence, the elastic force exerted by the spring 30 under elongation tends to increase the resistive torque. This tendency is particularly critical for monitoring high currents, e.g. currents above 6 kA, because at these current levels a spring 30 with a high elastic force has to be used in order to set an adequate current threshold value; for example a spring 30 with a high elastic constant and/or a great initial length $X_I$ can be used.

However, as disclosed above, the monitoring device 1 allows a relevant reduction of the minimum distance between the linear axis 35 of the spring 30 under elongation and the rotation axis 50. This means a relevant reduction of the resistive torque exerted by the spring 30 against the rotation of the element 20, reduction which opposes the effect of the increasing elastic force of the spring 30.

Preferably, the tilting of the spring 30 towards the rotation axis 50 is such that the final magnitude $T_F$ of the resistive torque is equal to or less than the initial magnitude $T_I$.

This condition is satisfied if:

$$K \cdot X_F \cdot D_2 \leq K \cdot X_I \cdot D_1,$$

where K is the elastic constant of the spring 30.

Hence, the tilting of the spring 30 towards the rotation axis 50 is preferably such that the second minimum distance $D_2$ is equal to or less than the first minimum distance $D_1$ multiplied by the ratio of the initial length $X_I$ to the final length $X_F$, i.e.

$$D_2 \leq \frac{XI}{XF} \cdot D_1.$$

According to the exemplary embodiment illustrated in FIGS. 1-7, the casing 100 of the monitoring device 1 comprises at least a lower wall 103 and an upper wall 104 which are arranged transversally with respect to the rotation axis 50; in particular, the rotation axis 50 is defined by a pin 51 which extends between and transversally to the lower and upper walls 103, 104.

The at least one spring 30 of the monitoring device 1 is operatively disposed in an internal space of the casing 100 between the magnetic circuit 2 and one of the walls 103 and 104. For example, in the embodiment illustrated in FIGS. 1-7 one spring 30 is operatively disposed in the space of the casing 100 between the wall 103 of the shell 102 and the magnetic circuit 2, in such a way that the spring 30 itself can move above the surface 21 of the element 20 under rotation during its tilting towards the rotation axis 50.

Preferably, the rotating element 20 comprises a first surface 22 and a second surface 23 which are opposed to each other and parallel to the rotation axis 50.

The first surface 22 and the second surface 23 are adapted to face a surface 17 and a surface 18, respectively, of the fixed part 10, when the rotating element 20 is in the second position.

Advantageously, the rotating element 20 further comprises at least one step portion 25, 26 between the first and second surfaces 22 and 23; in particular, such at least one portion 25, 26 is step-shaped so as to come more quickly closer to the fixed part 10, when the element 20 is rotating towards the second position. In this way, the element 20 under rotation catches more magnetic fields, increasing the efficiency of the energy transfer in the magnetic circuit 2.

In the exemplary embodiment illustrated in FIGS. 2-9, the rotating element has a substantially "S" shaped body, comprising:

- the first and second surfaces 22 and 23 which are adapted to contact the corresponding surfaces 17 and 18 of the fixed part 10, when the rotating element 20 reaches in the second position;
- a first step portion 25 adjacent to the first surface 22 and linked to the second surface 23 by a first curved portion 27; and
- a second step portion 26 adjacent to the second surface 23 and linked to the first surface 22 by a second curved portion 28.

The first and second step portions 25 and 26 are opposed to each other with respect to the rotation axis 50.

With reference to the exemplary plant views illustrated in FIGS. 4-7, a first end 31 of the spring 30 is operatively hooked to a corresponding support 33, such as a pin 33, above a portion of the fixed part 10.

The magnetic circuit 2 is arranged in such a way that the contact zone between the surface 22 of the S-shaped rotating element 20 and the corresponding surface 17 of the fixed part 10 is nearer to the support 33 than the contact zone between the surface 23 and the corresponding surface 18.

A second end 32 of the spring 30 is operatively hooked to the curved portion 27, in such a way that the rotation of the element 20 from the first position to the second position causes the tilting of the spring 30 towards the rotation axis 50. In particular, during such tilting the spring 30 moves above the surface 21 of the element 20 under rotation so as to reach a final position in which it passes above the zone of contact between the surfaces 22 and 17 (as illustrated for example in FIGS. 5 and 7).

According to the exemplary embodiment illustrated in the attached figures, the sensing means of the monitoring device 1 comprise at least one winding 60 wound around a corresponding portion of the magnetic circuit 2.

In this way, an electromotive force is applied at the ends of the winding 60 due to changing of the magnetic flux in the magnetic circuit 2 caused by the rotation of the element 20 from the first position to the second position. This electromotive force, which comprises a motional component depending on the angular speed of the element 20 under rotation, causes the generation of an output electrical signal 61 at the ends of the winding 60; this signal 61 has a peak which substantially occurs when the rotating element 20 reaches the second position.

The fixed part 10 of the magnetic circuit 2 illustrated for example in FIGS. 2-7 comprises a core 11 for surrounding the primary conductor 5, and the magnetic circuit 2 further comprises a branch 12 arranged in front of a corresponding shunt portion 13 of the core 11.

The branch 12 comprises the rotating element 20 and at least a fixed tract 16 connected to the core 11.

At least one air gap 15 is defined in the core 11, preferably in the shunt portion 13; the air gap 15 is dimensioned for causing a transfer of the magnetic flux from the core 11 to the branch 12, when the rotating elements 20 rotates from the first position to the second position. In this way, a more predictable distribution of the magnetic flux occurs, leading to a more accurate definition of the predetermined current threshold.

The sensing means of the monitoring device 1 illustrated for example in FIGS. 2-7 comprises a first winding 60 which is wound around a corresponding portion of the branch 12, in particular around the fixed tract 16.

Further, in addition to the first winding 60 the sensing means can advantageously comprise a second winding wound around the shunt portion 13 and in front of the first winding 60. In this way, the overall generated output electrical signal, being a superimposition of the output electrical signals of the two windings, is greater than the single output electrical signal 61 of the first winding 60.

In addition or alternatively to the at least one winding 60, the sensing means of the monitoring device 1 can comprise a position sensor 70 operatively associated to the rotating element 20 for sensing its rotation from the first position to the second position.

According to the exemplary embodiment illustrated in FIGS. 2-7, the monitoring device 1 comprises at least a first electrical terminal 80 and a second electrical terminal 81, and the position sensor comprises a conductive element 70.

In particular, the first electrical terminal 80 is electrically connected to the fixed part 10 of the magnetic circuit 2, and the conducting element 70 is electrically connected to the rotating element 20 and to the second electrical terminal 81 in such a way that an electrical connection is realized between the first and second terminals 80, 81 through the conducting element 70, when the rotating element 20 is in the second position.

In practice, the electrical connection between the first and second electrical terminals 80, 81 is realized by: the fixed part 10 of the electromagnetic circuit 2, the rotating element 20 in contact to the fixed part 10, and the conductive element 70 electrically connected to the rotating element 20.

In this way, an electrical signal given in input to one of the first and second electrical terminals 80, 81 causes a corresponding electrical output signal 62 at the other of the first and second electrical terminals 80, 81, when the rotating element 20 reaches its second position. Hence, the generated output electrical signal 62 is caused by the rotation of the element 20 from the first position to the second position; in particular, such signal 62 corresponds to the reaching of the second position.

More preferably, the conducting element 70 is arranged to keep the rotating element 20 coupled to the casing 100 of the monitoring device 1. For example, the conducting element 70 illustrated in FIGS. 2-7 is electrically connected to the rotating element 20 through the conductive pin 51; this conductive element 70 covers the central portion of the rotating element 20 and it is fixed to the shell 102.

Preferably, the monitoring device 1 comprises means 200 for adjusting the initial length $X_I$ of the spring 30; in this way, the adjusting means 200 can be used to adjust the predetermined current threshold above which the element 20 rotates from the first position to the second position.

In the exemplary embodiment illustrated in FIGS. 2-7, the adjusting means 200 comprise a tooth element 201 movable between a plurality of operative positions and operatively connected to the spring 30; in particular, the end 31 of the spring 30 illustrated in FIG. 2-7 is operatively hooked to a corresponding pin 33 which is fixed to the toothed element 201.

For example, the adjusting means 200 illustrated in FIGS. 2-7 further comprise a gear wheel 202 adapted to be actuated by an operator in order to engage the tooth element 201 and cause its linear displacement; according to the direction of such linear displacement, the initial length $X_I$ of the spring 30 is increased or reduced.

The gear wheel 202 can be actuated by an operator externally to the casing 100, for example through an accessible slot element 203 operatively connected to the gear wheel 202.

According to an embodiment not illustrated in the attached figures, the adjusting means 200 may further comprise a part movable with respect to the toothed element 201. This movable part is operatively connected to the spring 30, in such a way to adjust the initial length $X_I$ of the spring 30 according to a movement relative to the toothed element 201. In this way, a calibration of the predetermined current threshold value can be executed by the manufacturer of the monitoring device 1 through the displacement of the movable part, while an operator of the monitoring device 1 can adjust the threshold value through the tooth element 201.

The operation of the monitoring device 1 is disclosed by making particular reference to the exemplary embodiment illustrated in FIGS. 1-7, and to the corresponding schematic illustrations of FIGS. 8 and 9.

Figure 4:
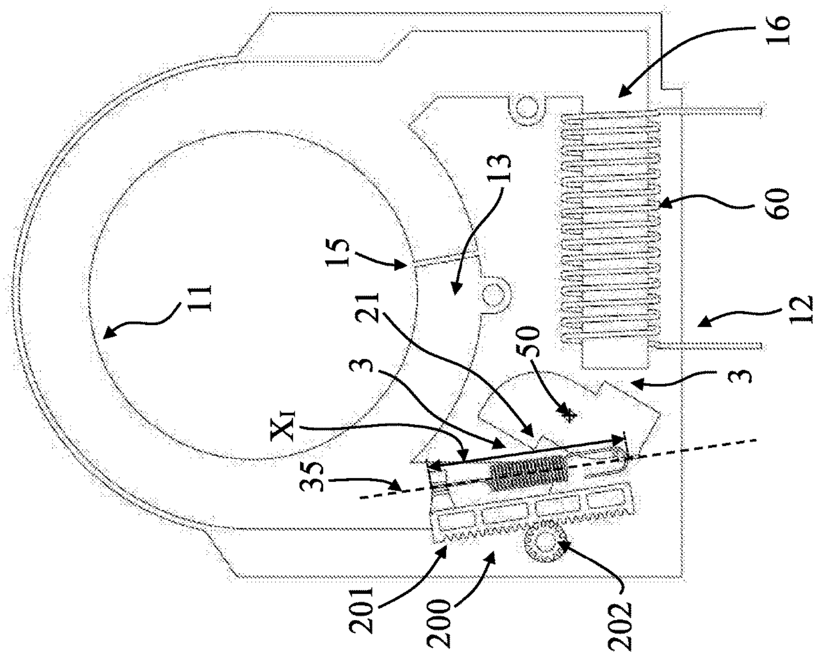
FIGS. 4-7 are plant views of some internal components of the current monitoring device of FIG. 1, such internal components comprising at least a rotating element and an associated spring.
Figure 6:
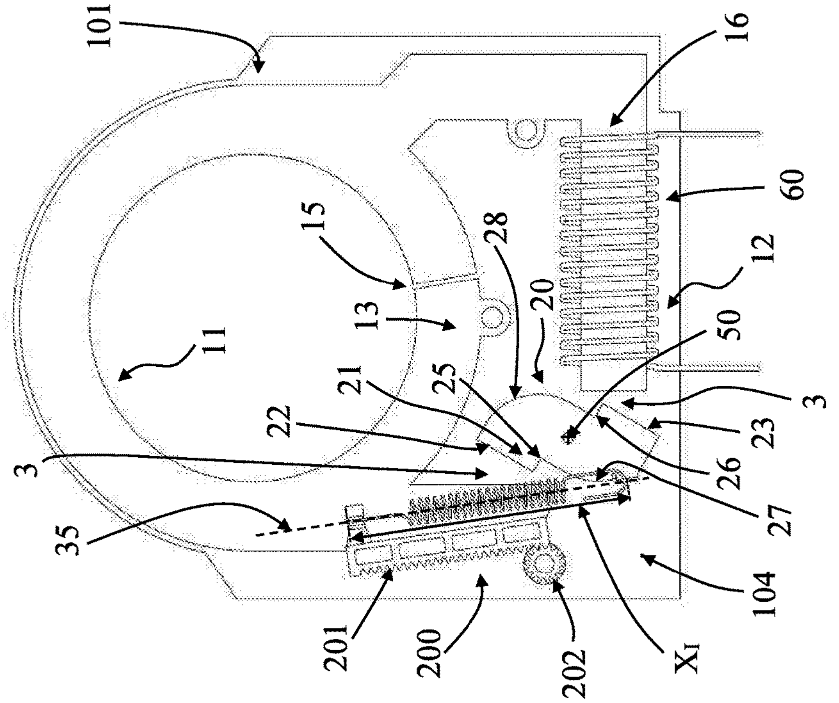

In particular, in FIGS. 4 and 6 there is illustrated the same monitoring device 1, wherein the magnetic circuit 2 is in the maximum reluctance configuration (i.e. with the fixed part 10 and rotating element 20 separated by the air gaps 3).

In FIG. 4 the spring 30 is in the rest position and has an initial length $X_I$ such that to set a minimum current threshold value, for example 400 A.

In FIG. 6 the initial length $X_I$ of the spring 30 has been increased through the means 200, so as to set a maximum current threshold value, for example 5 kA.

Therefore, FIGS. 4 and 6 illustrate an operative configuration of the monitoring device 1 where the current flowing in the primary conductor 5 is below the minimum current threshold value and the maximum threshold value, respectively.

In this situation, the magnetic flux generated by the current flowing in the primary conductor 5 is mainly linked to the core 11, and the electromagnetic force generated by the magnetic circuit 2 is not strong enough to overcome the spring 30 and cause the rotation of the element 20 away from the first position, towards the second position.

When the current flowing in the primary conductor 5 exceeds the minimum current threshold according to the example of FIG. 4 or when it exceeds the maximum current threshold according to the example of FIG. 6, the electromotive force acting on the rotating element 20 is strong enough to elongate the spring 30 and cause the rotation of the element 20 for reaching a minimum reluctance configuration of the magnetic circuit 2.

Figure 5:
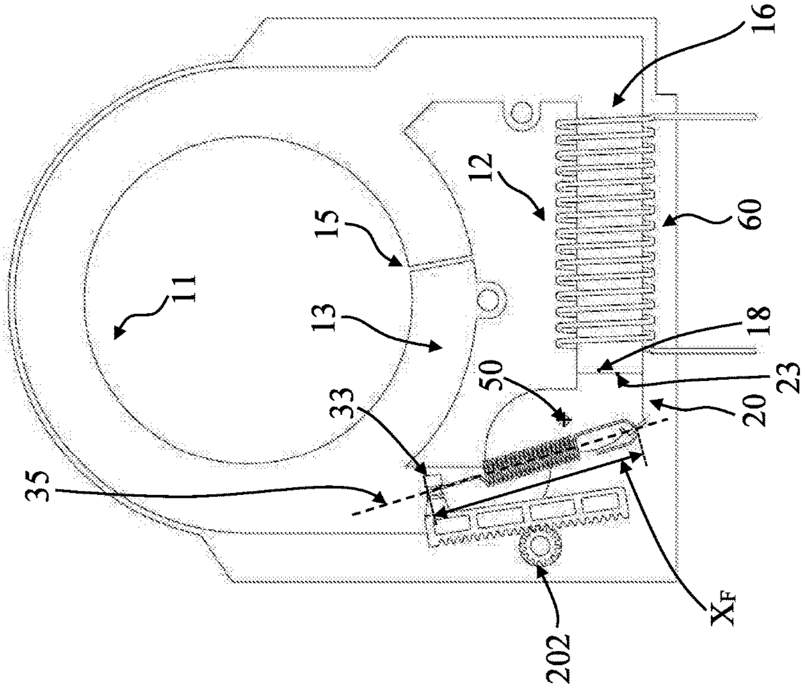
Figure 7:
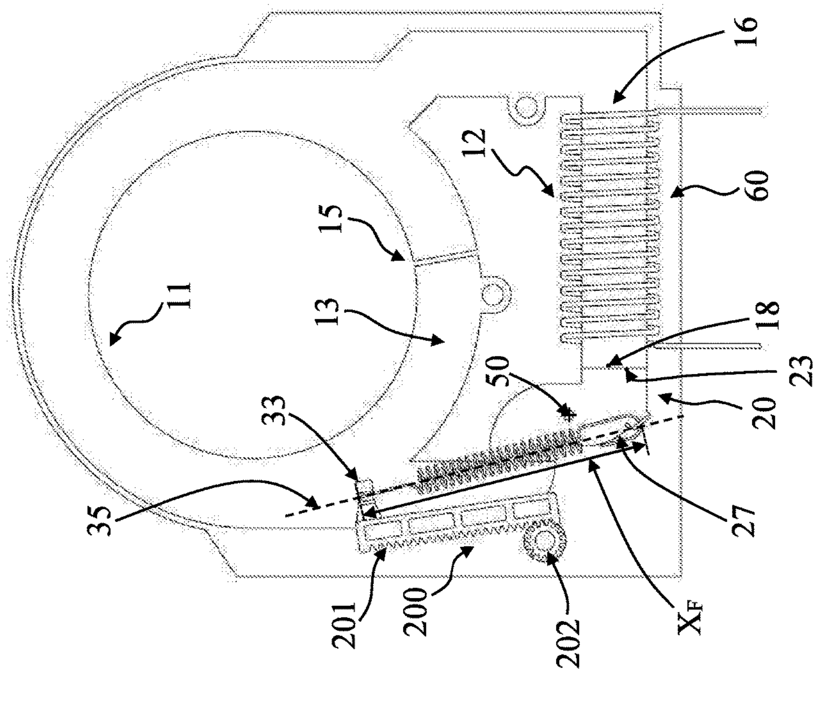

FIGS. 5 and 7 illustrate such minimum reluctance configuration reached starting from the situations illustrated in FIG. 4 and in FIG. 6, respectively. In particular, the surfaces 22 and 23 of the rotating element 20 are in contact the corresponding surfaces 17 and 18 of the fixed part 10, in such a way that the air gaps 3 are null.

During the rotation of the element 20 from the first position to the second position, the spring 30 under elongation advantageously tilts towards the rotation axis 50. Since during this tilting the spring 30 moves above the surface 21 of the element 20 under rotation, it can reach a position close to the rotation axis 50 as illustrated in FIGS. 5 and 7.

FIG. 8 (related to the starting and final situations illustrated in FIGS. 4 and 5) and FIG. 9 (related to the starting and final situations illustrated in FIGS. 6 and 7) show how advantageously the second minimum distance $D_2$ between the linear axis 35 of the spring 30 and the rotation axis 50 of the element 20 in the second position is less than the first minimum distance $D_1$ between the linear axis 35 and the axis of the rotation 50 of the element 20 in the first position.

In particular, the condition:

$$D_2 \leq \frac{XI}{XF} \cdot D_1$$

is satisfied.

During the rotation of the element 20 from the first position to the second position the magnetic flux linked to the core 11 is mainly induced to the branch 12.

The rotation of the element 20 causes a force applied at the ends of the winding 60, generating the output electrical signal 61.

Further, when the surfaces 22 and 23 of rotating element 20 contact the corresponding surfaces 17 and 18 of the fixed part 10, an electrical connection is realized between the first and second electrical terminals 80 and 81. In this way, an electrical signal 62 is output by the second terminal 81 and it is indicative of the occurred rotation of the element 20 and, therefore, of the exceeding of the predetermined current threshold value.

When the current flowing in the primary conductor 5 falls below the predetermined threshold, the electromagnetic force acting on the rotating element 20 is not strong enough to overcome the elastic force of the spring 20. Hence, the spring 20 causes the return of the element 20 from the second position to the first position.

The monitoring device 1 is particularly adapted to be used in a trip assembly for an electrical switching device, such as a low voltage or higher voltage circuit breaker.

Figure 11:
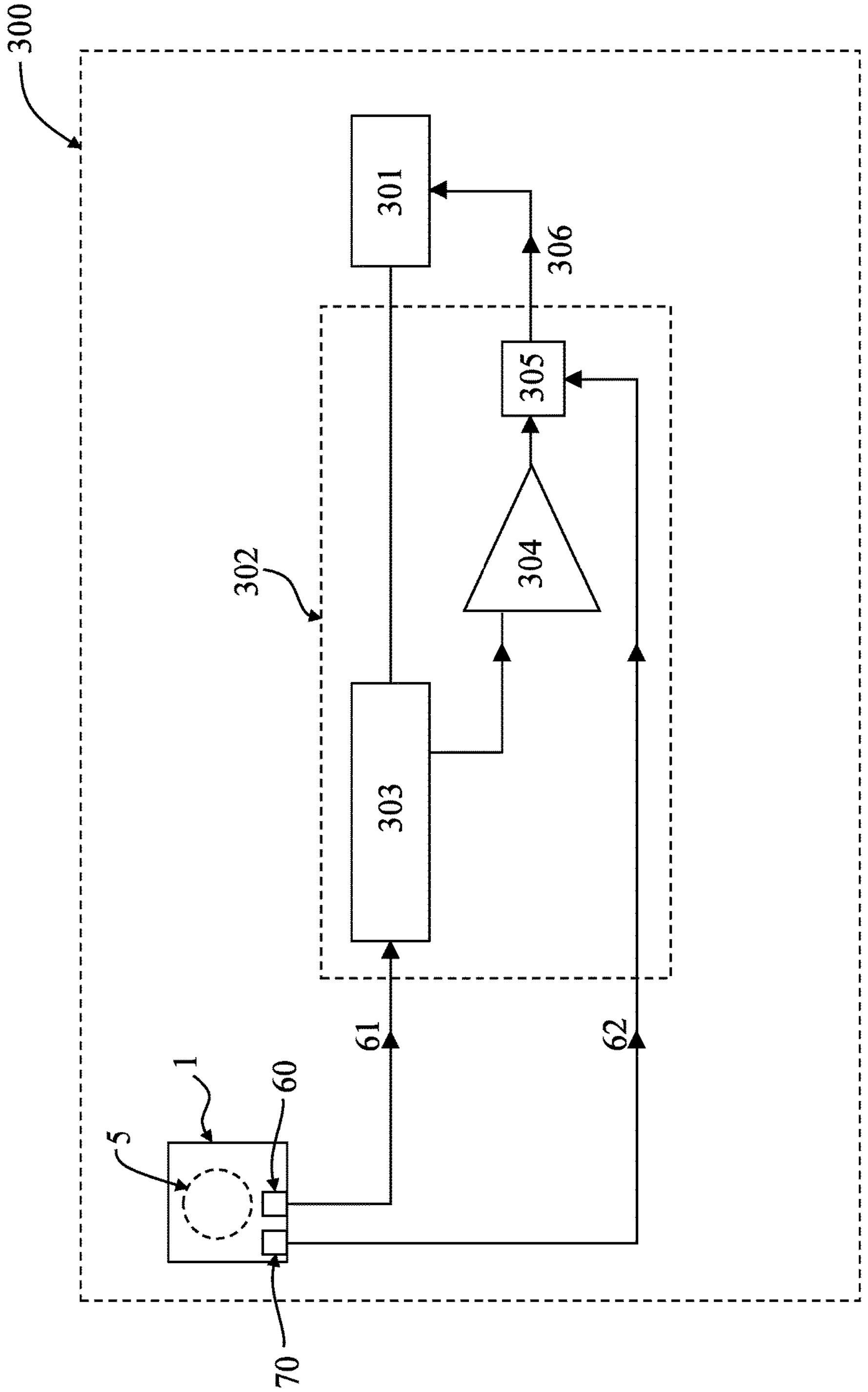
FIG. 11 is a schematic block representation of a trip assembly comprising a current monitoring device according to the present disclosure.

Hence, the present disclosure is also related to a trip assembly (schematically depicted and overall indicated with numeral reference 300 in FIG. 11) comprising at least one trip unit 301 for actuating the switching device, and a monitoring device 1 operatively associated to such trip unit 301. For example, the trip unit 301 can be an electronic unit 301, such as an electronic relay, or can be a trip coil 301.

Preferably, the trip assembly 300 comprises electronic means 302 which are operatively associated to the trip unit 301 and to the monitoring device 1. The electronic means 302 are adapted to apply an energy associated to the output electrical signal 61 from the at least one winding 60 of the monitoring device 1 to the trip unit 301.

If the trip unit 301 is an electronic unit, the signal 61 supplies it to drive actuation means of the switching device, such as a trip coil. If the trip unit 301 is directly a trip coil, the signal 61 supplies it with the energy necessary to trip and cause the actuation of the switching device.

In this way, the monitoring device 1 itself supplies the trip unit 301 for actuating the switching device, when it senses that the current flowing in the primary conductor 5 exceeds the predetermined current threshold value, for example in case of a fault condition, such as an overload or a short-circuit.

More preferably, the electronic means 302 are adapted to apply the energy to the trip unit 301 when the rotating element 20 of the monitoring device 1 reaches the second position. This is advantageous because the output electrical signal 61 is at its peak substantially when the rotating element 20 reaches its second position.

For example, the electronic means 302 are adapted to receive in input the output electrical signal 62 from the position sensor 70, and to use such signal 62 for applying the energy associated to the output electrical signal 61 to the trip unit 301, when the rotating element 20 reaches the second position.

In the exemplary trip assembly 300 illustrated in FIG. 11 the electronic means 302 comprise a capacitor 303 for storing the energy associated to output electrical signal 61, and a comparator 304 for generating an output signal when a voltage level associated to the capacitor 303 exceeds a predetermined threshold.

The output from the comparator 304 and the output 62 from the position sensor 70 are inputted to an electronic block 305; the electronic block 305 is adapted to output a trip command signal 306 when both the output signal from the comparator 304 and the output signal 62 from the position sensor 70 are present at the input of the block 305. In this way, the trip command signal 306 is generated only if the output electrical signal 61 is at its peak and is effectively due to the rotation of the element 20, and not to transient currents or noise.

The trip command signal 306 is used for driving the application of the energy stored in the capacitor 303 to the trip unit 301; for example, it can turn on an electronic switch for connecting the trip unit 301 to the capacitor 303.

Finally, the present disclosure is also related to an electrical switching device comprising at least one monitoring device 1 and/or at least one trip assembly 300.

Figure 12:
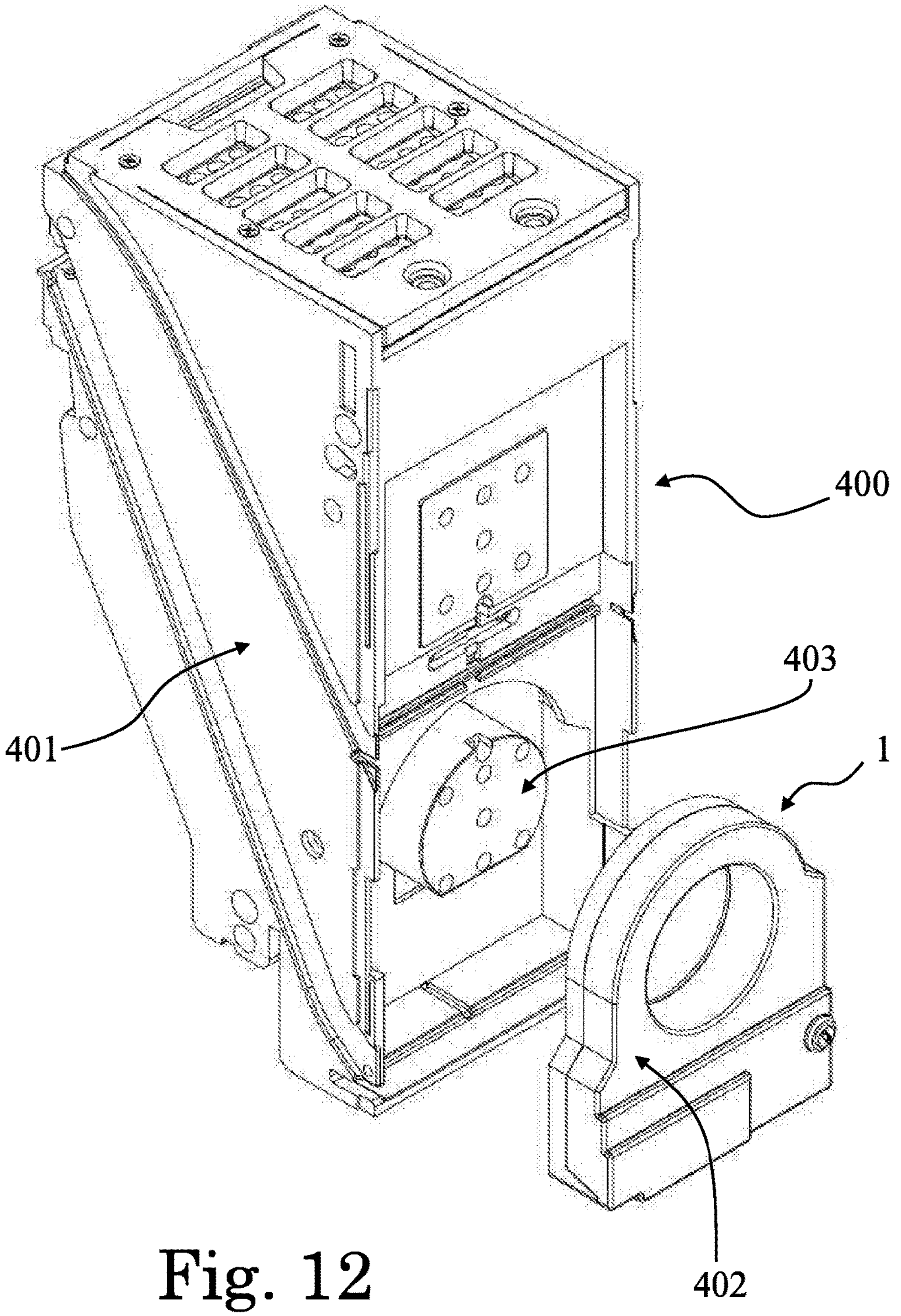
FIG. 12 illustrates the current monitoring device of FIG. 1 in phase of installation into a pole of a circuit breaker according to the present disclosure.

For example, in FIG. 12 a monitoring device 1 is illustrated in phase of assembly with a pole 400 of a circuit breaker. In particular, the insulating casing 401 of the pole 400 defines a seat 402 for receiving the monitoring device 1.

An electrical terminal 403 of the conducting path of the pole 400 is accessible into the seat 402; the monitoring device 1 can be installed into the seat 402 to surround such terminal 403. In this way, the monitoring device 1 is adapted to monitor the current flowing in the electrical conducting path of the pole 400 with respect to the predetermined current threshold.

Further, the monitoring device 1 installed into the seat 402 can be electrically connected with the trip unit 301 of the circuit breaker for configuring a trip assembly 300. For example, the monitoring device 1 can be electrically connected to the above disclosed electronic means 302, for configuring the trip assembly 300 illustrated in FIG. 11.

In practice, it has been seen how the monitoring device 1 allows achieving the intended object offering some improvements over known solutions.

In particular, the monitoring device 1 is adapted to sense when the current flowing in the primary conductor 5 exceeds a predetermined threshold value, even if such current is a direct current or an alternating current with low frequencies. In these current conditions, when the monitoring device 1 is used in the trip assembly 300, the electrical output signal 61 generated by the winding 60 is suitable for energizing the trip unit 301.

Further, the monitoring device 1 allows a relevant reduction of the minimum distance between the linear axis 35 of the spring 30 under tilting and the axis 50 of the element 20 under rotation.

This means an effective opposition to the increasing tendency of the resistive torque applied by the spring 30 under elongation against the desired rotation of the element 20.

In this way, a slowing of the desired rotation of the element 20 from the first position to the second position is at least reduced or a blocking of such desired rotation is prevented, even in applications where the current to be monitored is high and, hence, the spring 30 has to be configured for exerting a high elastic force.

Furthermore, among the provided advantages, there is a more efficient generation of the output electrical signal 61 by the winding 60.

Indeed, the mechanical work required for rotating the element 20 is subtracted to the amount of electrical energy which is generated in the winding 60 due to the changing of the magnetic circuit 2 from the maximum reluctance configuration to the minimum reluctance configuration.

This required mechanical work comprises a component depending to the resistive torque exerted by the spring 30 on the element 20 under rotation, component which is expressed as:

$$\int_{\beta_f}^{\beta_0} T(\beta) \cdot d\beta,$$

where T is the resistive torque and β the angle of rotation (in particular, $\beta_0$ is the initial angle and $\beta_f$ is the final angle).

Hence, the required mechanical work depends on the value of the final resistive torque $T_F$ at the angle $\beta_f$, value which is effectively reduced in the monitoring device 1 through the relevant reduction of the distance between the linear axis 35 of the spring 30 under tilting and the rotation axis 50.

Figure 10:
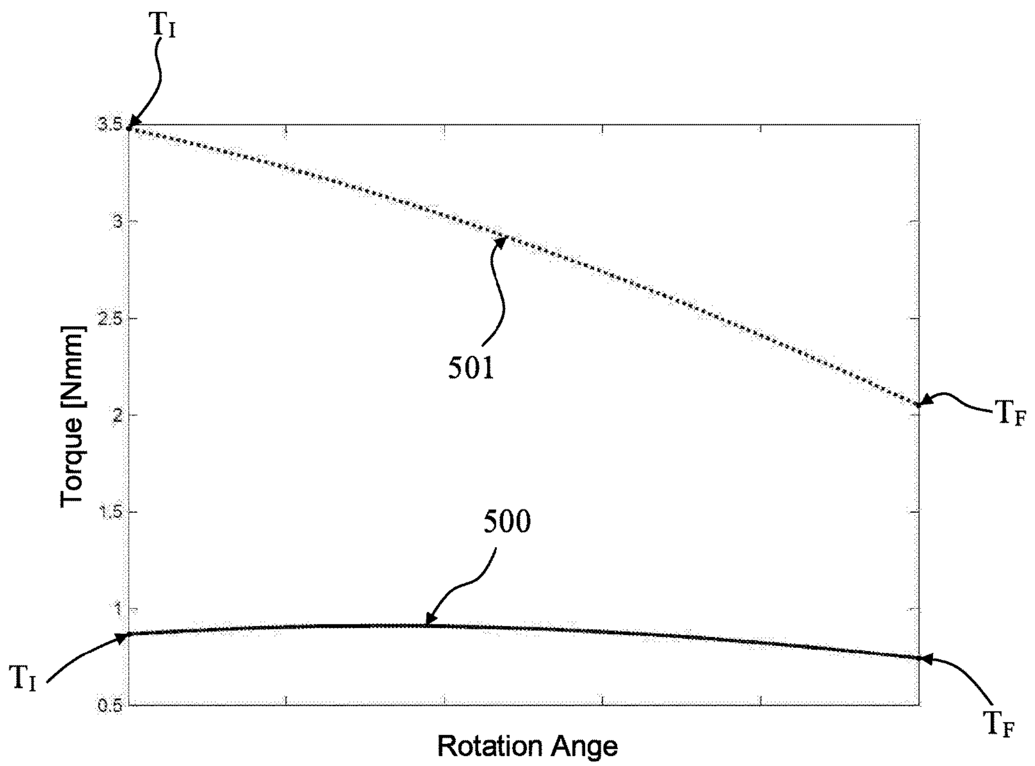
FIG. 10 is a plot illustrating a first simulation of the resistive torque exerted by the spring illustrated in FIGS. 4 and 5 on the associated element under rotation, and a second simulation of the resistive torque exerted by the spring illustrated in FIGS. 6 and 7 on the associated element under rotation.

FIG. 10 illustrates for example a graph where the ordinate corresponds to the magnitude of the resistive torque applied by the spring 30 to the element 20 under rotation from the first position to the second position, and where the abscissa corresponds to the angle of such rotation.

In particular, in the graph there are illustrated:

- a first simulation curve 500 of the resistive torque against the rotation of the element 20, rotation which leads the monitoring device 1 illustrated in FIG. 4 to the situation illustrated in 5; and
- a second simulation curve 501 of the resistive torque against the rotation of the element 20, rotation which leads the monitoring device 1 illustrated in FIG. 6 to the situation illustrated in FIG. 7.

Hence, the first simulation curve 500 is relative to the rotation of the element 20 when the illustrated monitoring device 1 is set to operate at the minimum current threshold, while the second simulation curve 502 is related to the rotation of the element 20 when the illustrated monitoring device 1 is set to operate at the maximum current threshold.

In both the first and second curves 500 and 501 the final magnitude $T_F$ of the resistive torque is less than the initial magnitude $T_I$, meaning that the opposition of the spring 30 to the rotation of the element 20 is advantageously decreasing during at least the final tract of the rotation, even if the elastic force of the spring 30 is increasing.

In particular, the first curve 500 has a decreasing final tract, such that the final magnitude $T_F$ of the resistive torque is less than the initial magnitude $T_I$.

Although the second curve 501 corresponds to the more critical situation of an higher set predetermined current threshold, this curve 501 is monotonically decreasing, leading to a significant reduction (more than 40%) of the magnitude of the resistive torque during the rotation of the element 20.

The relevant reduction of the minimum distance between the linear axis 35 of the spring 30 and the axis 50 of the element 20 under rotation is advantageously achieved in the monitoring device 1 by having the spring 30 moving above the surface 21 of the element 20, during at least a tract of its tilting. This is a solution also allowing the realization of a compact monitoring device 1, since it does not require a waste of space into the casing 100.

The monitoring device 1 thus conceived, and related trip assembly 300 and switching device, are also susceptible of modifications and variations, all of which are within the scope of the inventive concept as defined in particular by the appended claims.

For example, although in the exemplary embodiment illustrated in the attached figures the rotation from the first position to the second position causes the contact between the rotating element 20 and the fixed part 10 to eliminate the air gaps 3 between them, such rotation could be such that the rotating element 20 come closer to the fixed part 10 so as to reduce the air gaps 3, without completely eliminate them.

Although the winding 60 illustrated in the attached figures is wound around the fixed tract 16 of the branch 12, this winding 60 can alternatively be wound around the rotating element 20 or the shunt portion 13.

Although the spring 30 illustrated in the attached figure is operatively disposed in the space of the casing 100 between the wall 103 of the shell 102 and the magnetic circuit 2, the spring 30 can be operatively disposed in the space of the casing 100 between the wall 104 of the shell 101 and the magnetic circuit 2.

Although the position sensor 70 illustrated in the attached figures comprises the conducting element 70, such position sensor could alternatively be any other position sensor adapted to sense the rotation of the element 20 from the first position to the second position, such as an optical sensor.

Although the monitoring device 1 illustrated in the attached figures comprises both the winding 60 and the position sensor 70, it could alternatively comprise only the position sensor 70 for detecting the exceeding of the predetermined current threshold.

Although the monitoring device 1 according to the above disclosure is particularly adapted to monitor when a direct current or an alternating current with low frequency exceeds a predetermined current threshold, this device can be used in the same way for monitoring alternating currents with higher frequencies.

Although in FIG. 11 the monitoring device 1 is illustrated in phase of assembly with a pole 400 of a circuit breaker, the monitoring device 1 is suitable to be associated with the phase of other switching devices, such as contactors or disconnectors.

Although the above disclosed monitoring device 1 is adapted to monitor the current flowing in the primary conductor 5 with respect to a predetermined threshold, it can further comprises a current sensor, e.g. an Hall current sensor, for determining also the actual value of the flowing current.

Finally, all parts/components can be replaced with other technically equivalent elements; in practice, the type of materials, and the dimensions, can be any according to needs and to the state of the art.

The invention claimed is:

1. A device for monitoring a current in a primary conductor (5) with respect to a predetermined current threshold, said device comprising:

a magnetic circuit associable to said primary conductor and comprising a fixed part and an element which can rotate about a rotation axis;

at least one spring operatively connected to said rotating element for keeping the rotating element in a first position, said spring being elastically deformable along a linear axis (35); and sensing means operatively associated to said magnetic circuit; wherein:

said magnetic circuit is configured in such a way that the rotating element rotates from the first position to a second position when the current in the primary conductor exceeds said predetermined current threshold, so as to at least reduce one or more air gaps between the rotating element and the fixed part and to elongate the spring along the linear axis from a first length ($X_I$) to a second length ($X_F$); and said sensing means are configured for generating an output electrical signal caused by said rotation of the rotating element from the first position to the second position;

wherein said at least one spring is operatively connected to said rotating element in such a way that the spring tilts towards the rotation axis moving above a surface of the rotating element which is transversal to the rotation axis, during said rotation of the rotating element from the first position to the second position.

2. The device according to claim 1, wherein said linear axis (35) and said rotation axis (50) are separated by a first minimum distance ($D_1$) when the rotating element is in the first position and by a second minimum distance ($D_2$) when the rotating element is in the second position, and wherein said tilting of the spring is such that said second minimum distance ($D_2$) is equal to or less than the first minimum distance ($D_1$) multiplied by the ratio of the first length ($X_I$) to the second length ($X_F$).

3. The device according to claim 1, wherein said rotating element comprises:

a first surface and a second surface opposed to each other with respect to said rotation axis and each adapted to face a corresponding surface of the fixed part, when the rotating element is in the second position; and at least one step portion between said first and second surfaces.

4. The device according to claim 1, wherein said sensing means comprise at least one winding wound around a corresponding portion of said magnetic circuit.

5. The device according to claim 4, wherein:

said fixed part comprises a core for surrounding said primary conductor;

said magnetic circuit comprises a branch arranged in front of a corresponding shunt portion of said core, said branch comprising said rotating element; and said at least one winding is wound around at least one of said branch and shunt portion.

6. The device according to claim 5, wherein said at least one winding comprises a first winding wound around said branch, and a second winding wound around said shunt portion.

7. The device according to claim 1, wherein said sensing means comprise a position sensor operatively associated to said rotating element.

8. The device according to claim 7, comprising a first electrical terminal and a second electrical terminal, wherein the first electrical terminal is electrically connected to said fixed part of the magnetic circuit, and wherein said position sensor comprises a conducting element which is electrically connected to said rotating element and to said second electrical terminal in such a way that an electrical connection is realized between the first and second terminals through the conducting element when the rotating element is in the second position.

9. The device according to claim 1, comprising means for adjusting said first length ($X_I$) of the spring.

10. The device according to claim 9, wherein said adjusting means comprise a tooth element movable between a plurality of operative positions and operatively connected to said at least one spring.

11. A trip assembly for an electrical switching device, comprising at least one trip unit for actuating the switching device, and wherein it comprises a device according to claim 1 which is operatively associated to said at least one trip unit.

12. The trip assembly according to claim 11, comprising electronic means operatively associated to said at least one trip unit and to said device, said electronic means being adapted to apply an energy associated to the output electrical signal from the at least one winding of the device (1) to the trip unit.

13. The trip assembly according to claim 12, wherein said electronic means are adapted to apply said energy to the trip unit, when said rotating element reaches the second position.

14. The trip assembly according to claim 13, wherein said electronic means are adapted to receive in input and use the output electrical signal from the position sensor of said device, so as to apply said energy to the trip unit when the rotating element reaches the second position.

15. A switching device which comprises at least one device according to claim 1.

16. The device according to claim 2, wherein said rotating element-comprises:

a first surface and a second surface opposed to each other with respect to said rotation axis and each adapted to face a corresponding surface of the fixed part, when the rotating element is in the second position; and at least one step portion between said first and second surfaces.

17. The device according to claim 2, wherein said sensing means comprise at least one winding wound around a corresponding portion of said magnetic circuit.

18. The device according to claim 3, wherein said sensing means comprise at least one winding wound around a corresponding portion of said magnetic circuit.

19. The device according to claim 2, wherein said sensing means comprise a position sensor operatively associated to said rotating element.

20. The device according to claim 2, wherein said sensing means comprise a position sensor operatively associated to said rotating element.

* * * * *